(12) United States Patent
Mitsugi et al.

(10) Patent No.: US 9,656,901 B2
(45) Date of Patent: May 23, 2017

(54) METHOD OF MANUFACTURING A GLASS ROLL

(71) Applicant: NIPPON ELECTRIC GLASS CO., LTD., Shiga (JP)

(72) Inventors: Kaoru Mitsugi, Shiga (JP); Hiromichi Umemura, Shiga (JP); Michiharu Eta, Shiga (JP); Yasuo Teranishi, Shiga (JP); Yoshinori Hasegawa, Shiga (JP); Koichi Mori, Shiga (JP); Hiroki Mori, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 976 days.

(21) Appl. No.: 13/724,353

(22) Filed: Dec. 21, 2012

(65) Prior Publication Data

US 2013/0129987 A1 May 23, 2013

Related U.S. Application Data

(63) Continuation-in-part of application No. PCT/JP2012/066252, filed on Jun. 26, 2012, and a
(Continued)

(30) Foreign Application Priority Data

Mar. 3, 2010 (JP) .................................. 2010-046111
Jun. 30, 2011 (JP) .................................. 2011-146123

(51) Int. Cl.
*C03B 35/16* (2006.01)
*B32B 17/06* (2006.01)
(Continued)

(52) U.S. Cl.
CPC .............. *C03B 35/163* (2013.01); *B32B 3/02* (2013.01); *B32B 17/064* (2013.01); *B65H 18/08* (2013.01);
(Continued)

(58) Field of Classification Search
CPC . B65G 2249/04; C03B 35/163; C03B 35/165; C03B 17/06; B32B 3/02
(Continued)

(56) References Cited

U.S. PATENT DOCUMENTS 5,242,365 A * 9/1993 Counts ................... B31B 23/00
                                                           493/188
6,502,423 B1    1/2003 Ostendarp et al.
(Continued)

FOREIGN PATENT DOCUMENTS

EP    1 860 075    11/2007
EP    2 077 255    7/2009
(Continued)

OTHER PUBLICATIONS

International Search Report issued May 31, 2011 in corresponding International (PCT) Application No. PCT/JP2011/054701.
(Continued)

*Primary Examiner* — Alison L Hindenlang
*Assistant Examiner* — Mohamed K Ahmed Ali
(74) *Attorney, Agent, or Firm* — Wenderoth, Lind & Ponack, L.L.P.

(57) ABSTRACT

A method of manufacturing a glass roll, includes: a forming step (S1) of forming, while conveying a glass film, the glass film by a downdraw method; a temporary rolling step (S3) of rolling the glass film while superposing a protective film on the glass film at a downstream end of a path of the conveying in the forming step (S1), to thereby manufacture a source glass roll; and a main rolling step (S4) of unrolling,
(Continued)

while conveying the glass film to a downstream side, the glass film from the source glass roll, and then rerolling the glass film while superposing a protective film on the glass film at a downstream end of a path of the conveying, to thereby manufacture a glass roll. Higher tension in a rolling direction is applied to the glass film in the main rolling step (S4) than in the temporary rolling step (S3).

16 Claims, 5 Drawing Sheets

Related U.S. Application Data continuation-in-part of application No. 13/038,747, filed on Mar. 2, 2011, now abandoned.

(51) Int. Cl.
- *B32B 3/02* (2006.01)
- *C03B 17/06* (2006.01)
- *C03B 33/023* (2006.01)
- *B65H 18/08* (2006.01)
- *B65H 18/10* (2006.01)

(52) U.S. Cl.
CPC .......... *B65H 18/103* (2013.01); *C03B 17/06* (2013.01); *C03B 33/0235* (2013.01); *B65H 2301/121* (2013.01); *B65H 2301/4127* (2013.01); *B65H 2301/414324* (2013.01); *B65H 2801/61* (2013.01); *Y02P 40/57* (2015.11); *Y10T 428/24752* (2015.01); *Y10T 428/24777* (2015.01); *Y10T 428/266* (2015.01)

(58) Field of Classification Search
USPC .................. 65/535, 370.1, 150, 94; 428/332
See application file for complete search history.

(56) References Cited

U.S. PATENT DOCUMENTS

| | | |
|---|---|---|
| 2007/0275338 A1 | 11/2007 | Acker et al. |
| 2009/0314032 A1 | 12/2009 | Tomamoto et al. |
| 2010/0031702 A1 | 2/2010 | Tomamoto et al. |
| 2010/0192634 A1* | 8/2010 | Higuchi ............. B29C 66/7465 65/60.1 |
| 2010/0276066 A1 | 11/2010 | Kondo |
| 2011/0177325 A1* | 7/2011 | Tomamoto ............. B65H 18/28 428/332 |
| 2011/0177347 A1 | 7/2011 | Tomamoto et al. |
| 2011/0192878 A1* | 8/2011 | Teranishi ............. B32B 17/064 226/1 |
| 2013/0133809 A1 | 5/2013 | Kondo |

FOREIGN PATENT DOCUMENTS

| | | | |
|---|---|---|---|
| EP | 2 277 835 | 1/2011 | |
| JP | 2000-335928 | 12/2000 | |
| JP | 2001-097733 | 4/2001 | |
| JP | 2004-505881 | 2/2004 | |
| JP | 2007-314414 | 12/2007 | |
| JP | 2008-105882 | 5/2008 | |
| JP | 2008-133174 | 6/2008 | |
| JP | WO 2010038758 A1 * | 4/2010 | ............. B65H 18/28 |
| JP | WO 2010038761 A1 * | 4/2010 | ............. C03B 17/06 |
| JP | 2010-132350 | 6/2010 | |
| JP | 2011-201765 | 10/2011 | |
| WO | 02/14229 | 2/2002 | |
| WO | 2009/093505 | 7/2009 | |
| WO | 2010/038760 | 4/2010 | |

OTHER PUBLICATIONS

International Preliminary Report on Patentability and Written Opinion of the International Searching Authority issued Oct. 11, 2012 in International (PCT) Application No. PCT/JP2011/054701.

* cited by examiner

METHOD OF MANUFACTURING A GLASS ROLL

CROSS-REFERENCE TO RELATED APPLICATIONS

This is a continuation-in-part application of international application PCT/JP2012/066252 filed Jun. 26, 2012 and U.S. patent application Ser. No. 13/038,747 filed Mar. 2, 2011, and claiming the priorities of Japanese application 2011-146123 filed Jun. 30, 2011 and Japanese application 2010-046111 filed Mar. 3, 2010.

TECHNICAL FIELD

The present invention relates to an improved technology of manufacturing a glass roll which is obtained by rolling a glass film formed by a downdraw method.

BACKGROUND ART

As is well known, flat panel displays (FPDs) have become mainstream as image display devices in recent years, the FPDs being typified by a liquid crystal display, a plasma display, an organic light-emitting diode (OLED) display, and the like. As substrates for those FPDs, glass substrates are used in order to secure various demanded properties such as airtightness, flatness, heat resistance, translucency, and insulation property. Further, in view of reducing a weight, the glass substrates to be used for the FPDs are currently becoming thinner. In particular, the FPDs such as an OLED display may be used under a state in which a display screen is bent, and hence thinning of the glass substrates has been expected for the purpose of imparting flexibility to the glass substrates.

Further, there is a growing use of an OLED as a plane light source, such as a light source for interior illumination, which emits only monochrome (for example, white) light, unlike a display that uses TFTs to blink light of three fine primary colors. Further, when an OLED illumination device includes a glass substrate having flexibility, a light-emitting surface is freely deformable, which leads to an advantage in that the OLED illumination device is usable for a significantly wider range of applications. Therefore, from the viewpoint of ensuring sufficient flexibility, there is also promoted further thinning of the glass substrate to be used for the illumination device of this type.

In addition, operation of a touchscreen is performed by rubbing a surface of the touchscreen with human fingers and the like, and hence a glass substrate is often used in order to ensure fastness property of the surface of the touchscreen. Along with widespread use of mobile devices equipped with a touchscreen of this type, thinning of the glass substrate for the touchscreen is required for reduction in weight of the mobile devices.

In response to the above-mentioned demands for thinning, a glass film thinned into a film shape (for example, having a thickness of 300 µm or less) has been developed. The glass film has appropriate flexibility, and hence is sometimes stored in a state of a so-called glass roll that is formed by superposing a protective film on the glass film, and rolling the glass film together with the protective film around a roll core (for example, see Patent Literature 1). This reduces a storage space for the glass film remarkably, and hence it is possible to increase transportation efficiency. Further, with use of a roll-to-roll apparatus, various processes such as cutting and film formation can be sequentially performed on a glass film that is unrolled from a glass roll situated on an upstream side, and hence it is possible to remarkably increase production efficiency.

CITATION LIST

Patent Literature 1: JP 2010-132350 A

SUMMARY OF INVENTION

Technical Problems

By the way, the glass film is often formed by a downdraw method. Accordingly, in a case where the glass film is stored in a state of a glass roll, it is necessary that the glass film which is continuously formed from a forming body for carrying out the downdraw method be rolled directly around the roll core.

However, in this case, when extreme tension (for example, tension of about 100 N per unit width (1 m) to the glass film) is applied to the glass film at the time of rolling, excessive tension is applied to a part of the glass film that is in a softened state near the forming body. As a result, a thickness of the glass film may become unstable or a warpage or a wave may occur in the glass film. In some cases, there may arise such a fatal problem that the glass film breaks below the forming body.

Therefore, it is actually difficult to roll the glass film while applying satisfactory tension to the glass film, and for example, the rolled glass film moves afterward in a width direction thereof, with the result that roll misalignment is more likely to occur. Further, unless the glass film is rolled while appropriate tension is applied to the glass film, the glass film in the state of the glass roll is separated from the roll core, and hence an improper gap may be formed between layered parts of the glass film. Further, when the roll misalignment or the separation (radial gap) occurs in the glass film in this manner, the glass film is more likely to break, which leads to extremely troublesome handling. In addition, in this case, the glass film is rolled irregularly, and hence an appearance of the glass roll is extremely deteriorated, which may cause degradation in product value.

In view of the above-mentioned circumstances, the present invention has a technical object to reduce as much as possible occurrence of roll misalignment or separation in a glass film included in a glass roll when the glass film formed continuously by a downdraw method is stored in a state of the glass roll.

Solution to Problems

According to a first invention made to achieve the above-mentioned object, there is provided a method of manufacturing a glass roll, comprising: a forming step of forming, while conveying a glass film to a downstream side, the glass film by a forming device for carrying out a downdraw method; a first rolling step of rolling the glass film while superposing a first protective film on the glass film at a downstream end of a path of the conveying in the forming step, to thereby manufacture a source glass roll; and a second rolling step of unrolling, while conveying the glass film to the downstream side, the glass film from the source glass roll, and then rerolling the glass film while superposing a second protective film on the glass film at a downstream end of a path of the conveying, to thereby manufacture a glass roll, wherein tension in a rolling direction to be applied to the glass film in the second rolling step is set higher than tension to be applied to the glass film in the first rolling step.

With this method, the glass film rolled in the first rolling step is rerolled under a state in which higher tension is applied in the rolling direction (direction of conveying the glass film) in the second rolling step than in the first rolling step. Accordingly, in the first rolling step in which the glass film formed by the forming device is rolled directly, it is unnecessary to roll the glass film while applying excessive tension to the glass film. In other words, in the first rolling step, it is only necessary to apply tension to the glass film within such a range as to prevent adverse effects such as an unreasonable fluctuation in thickness of the glass film formed by the forming device. As a result, even if roll misalignment or separation occurs in the glass film, it is possible to straighten the roll misalignment or the separation in the second rolling step. That is, in the second rolling step, even if high tension is applied to the glass film, formation of the glass film is not adversely affected. Thus, while applying tension high enough to prevent the roll misalignment or the separation from occurring in the glass film, it is possible to reroll the glass film so as to manufacture the glass roll.

In the above-mentioned method, it is preferred that, in the first rolling step, tension in the rolling direction to be applied to the first protective film be set higher than the tension in the rolling direction to be applied to the glass film.

With this, without applying high tension directly to the glass film, it is possible to restrain movement of the glass film by the first protective film. That is, it is possible to obtain the same effect as that in a case of applying tension directly to the glass film. Accordingly, it is possible to minimize the roll misalignment or the separation of the glass film that occurs in the first rolling step. Further, the glass film in a state of the source glass roll is reliably held by the first protective film, and hence the following situation is less likely to arise: the glass film in the source glass roll is rolled extremely tightly when the glass film is unrolled from the source glass roll in the second rolling step. Note that, when the glass film is rolled tightly, friction is generated between the glass film and the protective film, and hence micro flaws may be formed in a surface of the glass film.

In the above-mentioned method, in the second rolling step, the tension in the rolling direction to be applied to the glass film may be set higher than tension in the rolling direction to be applied to the second protective film.

With this, in the glass roll to be manufactured in the second rolling step, that is, in the glass roll to be manufactured as a product, it is possible to reliably prevent such a situation that tension applied to the glass film itself causes the roll misalignment or the separation in the glass film afterward. In other words, the glass film is not straightened by being forcibly held by the second protective film, and hence extreme stress is less likely to act on the glass film. As a result, a stable package state can be maintained.

In the above-mentioned method, it is preferred that, in the second rolling step, the glass film be conveyed while only one surface of the glass film is contact-supported.

With this, another surface of the glass film is formed as a non-contact surface. Accordingly, micro flaws resulting from conveyance are less likely to be formed in the surface of the glass film formed as the non-contact surface. Therefore, in a case where a glass substrate for FPDs such as an OLED display is fabricated from the glass film, when elements and wiring are formed on the non-contact surface side of the glass film, the micro flaws are less likely to cause poor formation of the elements and the wiring. Accordingly, it is possible to provide highly-reliable FPDs.

In the above-mentioned method, it is preferred that, in the second rolling step, the glass film be rolled so that the contact-supported surface of the glass film is situated on an inner peripheral surface side of the glass roll.

With this, even if the micro flaws occur in the contact-supported surface of the glass film, the glass film is rolled so that the contact-supported surface is situated on the inner peripheral surface side of the glass roll, and hence only compressive stress is applied to the contact-supported surface. Therefore, even when the micro flaws occur in the contact-supported surface, a force to propagate the micro flaws is less likely to act. In other words, on the outer peripheral surface side of the glass film on which the force to propagate the micro flaws acts, a non-contact surface having substantially no micro flaws is situated, and hence breakage of the glass film can be reliably reduced.

In the above-mentioned method, in at least one of the first rolling step and the second rolling step, the glass film may be rolled after being cut by laser cutting into pieces each having a predetermined width. Here, the laser cutting comprises laser cleaving and laser fusing. The laser cleaving is a method of cutting the glass film in such a manner that an initial crack is propagated by utilizing thermal stress that is generated through expansion due to a heating action of laser and through contraction due to a cooling action of a refrigerant. On the other hand, the laser fusing is a cutting method of a jetting high pressure gas to a region of glass that is heated by laser energy to be softened and melted.

With this method, for example, in a case where the glass film is formed by an overflow downdraw method, it is possible to roll the glass film after cutting and removing an unavailable portion (ear portion) which is formed at each widthwise end portion of the glass film to have a relatively large thickness. Further, it is possible to roll the glass film after changing the glass film into pieces each having a desired width. The pieces of the glass film are cut by laser cutting, and hence it is possible to obtain an advantage that micro cracks causing breakage are less likely to be formed in a cut end surface of the glass film.

In the above-mentioned method, it is preferred that the downdraw method be an overflow downdraw method.

With this, without subjecting the surface of the glass film to separate processing after formation of the glass film, excellent smoothness with low surface roughness can be imparted to the surface of the glass film.

In the above-mentioned method, it is preferred that the glass film have a thickness of 1 µm or more and 300 µm or less.

With this, satisfactory flexibility can be imparted to the glass film, and hence it is possible to reduce such a situation that extreme stress is applied to the glass film when the glass film is rolled, which leads to prevention of breakage of the glass film.

According to a second invention made to achieve the above-mentioned object, there is provided a method of manufacturing a glass roll, comprising: forming a glass film by a downdraw method; and rolling the formed glass film while superposing the glass film on a protective film, wherein the glass film and the protective film are rolled while higher tension in a rolling direction is applied to the protective film than to the glass film.

With this method, without applying high tension in the rolling direction to the glass film, the glass film can be tightened by relatively high tension in the rolling direction applied to the protective film, and hence the glass roll free from loose rolling can be manufactured. Further, tension in the rolling direction is not applied to the glass film or the tension is low at the time of rolling the glass film. Accordingly, even in a case where the glass film is rolled after being curved along a substantially horizontal direction in a curved region, a change in curvature of the curved region can be prevented, and hence formation of the glass film is stabilized, with the result that the glass film free from warpage, waviness, and a change in thickness can be rolled.

In the above-mentioned method, an unavailable portion (ear portion) formed at each widthwise end portion of the glass film may be cut by a laser cutting by the time the glass film is rolled. Here, the laser cutting comprises laser cleaving and laser fusing. The laser cleaving is a method of cutting the glass film in such a manner that an initial crack is propagated by utilizing thermal stress that is generated through expansion due to a heating action of laser and through contraction due to a cooling action of a refrigerant. On the other hand, the laser fusing is a cutting method of jetting a high pressure gas to a region of glass that is heated by laser energy to be softened and melted.

With this, without performing post-processing such as polishing, it is possible to easily impart moderate smoothness to a cut surface constituting each widthwise end surface of the glass film. Further, relatively high tension in the rolling direction is applied to the protective sheet, and hence the end surface of the glass film and the protective sheet are easily held in contact with each other. However, even in the case of contact, owing to the smoothed end surface of the glass film, the end surface does not bite into the protective sheet, and hence it is possible to satisfactorily maintain separability between the glass film and the protective sheet. Further, when rolling the glass film, small flaws are less likely to occur on the each end surface of the glass film. Thus, it is possible to reduce glass powder, which is generated due to chips resulting from the small flaws on the end surface of the glass film, and hence there is a great advantage in ensuring cleanness of the front and back surfaces of the glass film.

In the above-mentioned method, it is preferred that the glass film and the protective film be rolled while the protective film is superposed on an outer peripheral surface side of the glass film so that the protective film may be kept to form an outermost layer.

With this, the glass film can be easily tightened by the protective film, and hence it is possible to reliably manufacture the glass roll free from looseness.

In the above-mentioned method, it is preferred that the downdraw method be an overflow downdraw method.

With this, it is possible to form the glass film excellent in surface smoothness without performing additional processing after the forming, and hence it is possible to easily manufacture the glass roll excellent in surface accuracy.

According to a third invention made to achieve the above-mentioned object, there is provided a glass roll, which is obtained by rolling a glass film formed by a downdraw method while superposing the glass film on a protective film, wherein higher tension in a rolling direction is applied to the protective film than to the glass film.

This configuration can provide a glass roll without looseness, which is obtained by rolling the glass film free from warpage, waviness, and a change in thickness.

In the above-mentioned configuration, it is preferred that the glass film have a thickness of 1 µm or more and 300 µm or less.

With this, it is possible to impart appropriate flexibility to the glass film. Accordingly, it is possible to reduce extreme stress to be applied to the glass film when rolling the glass film, and to prevent the glass film from breaking.

In the above-mentioned configuration, it is preferred that each widthwise end surface of the glass film have an arithmetic average roughness Ra of 0.1 µm or less.

With this, it is possible to impart appropriate smoothness to the each widthwise end surface of the glass film. Relatively high tension in the rolling direction is applied to the protective sheet, and hence the end surface of the glass film and the protective film are easily held in contact with each other. However, even in the case of contact, owing to the smoothed end surface of the glass film, the end surface does not bite into the protective film, and hence it is possible to satisfactorily maintain separability between the glass film and the protective film.

In the above-mentioned configuration, it is preferred that the protective film extend beyond both widthwise sides of the glass film.

With this, it is possible to protect the each widthwise end surface of the glass film with the protective film. Further, each widthwise end of the glass film is covered with the protective film, and hence it is also possible to prevent intrusion of foreign matters from an outside.

Advantageous Effects of Invention

According to the above-mentioned first invention, after the glass film formed by a downdraw method is rolled in the first rolling step, the rolled glass film is rerolled in the second rolling step while higher tension is applied in the rolling direction in the second rolling step than in the first rolling step. Accordingly, even in a case where the glass film is formed continuously by a downdraw method, appropriate tension is applied to the glass film through the first rolling step and the second rolling step, and hence it is possible to manufacture the glass roll in which the roll misalignment or the separation is less likely to occur.

Further, according to the above-mentioned second and third inventions, without applying high tension in the rolling direction to the glass film, the glass film can be tightened by relatively high tension in the rolling direction that is applied to the protective film, and hence it is possible to manufacture the glass roll in which the roll misalignment or the separation is less likely to occur.

DESCRIPTION OF EMBODIMENTS

Hereinafter, embodiments of the present invention are described with reference to the drawings.

Figure 1:
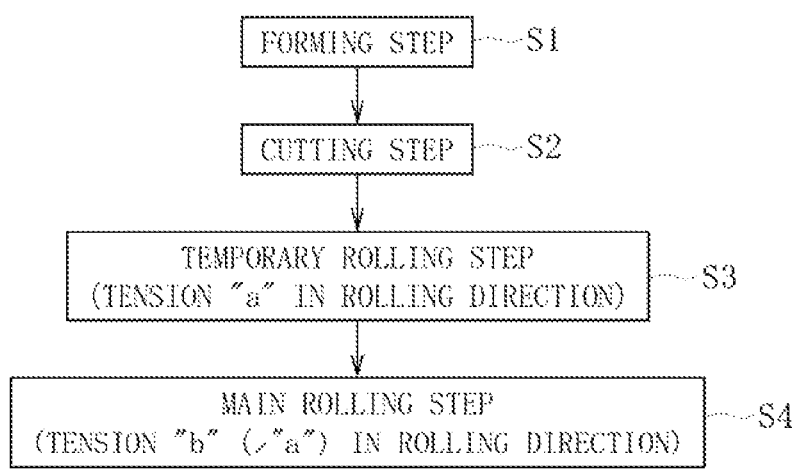
FIG. 1 A flow chart illustrating a method of manufacturing a glass roll according to an embodiment of the present invention.

FIG. 1 is a flow chart illustrating a method of manufacturing a glass roll according to a first embodiment of the present invention. The method of manufacturing a glass roll comprises a forming step S1, a cutting step S2, a temporary rolling step (first rolling step) S3, and a main rolling step (second rolling step) S4.

Figure 2:
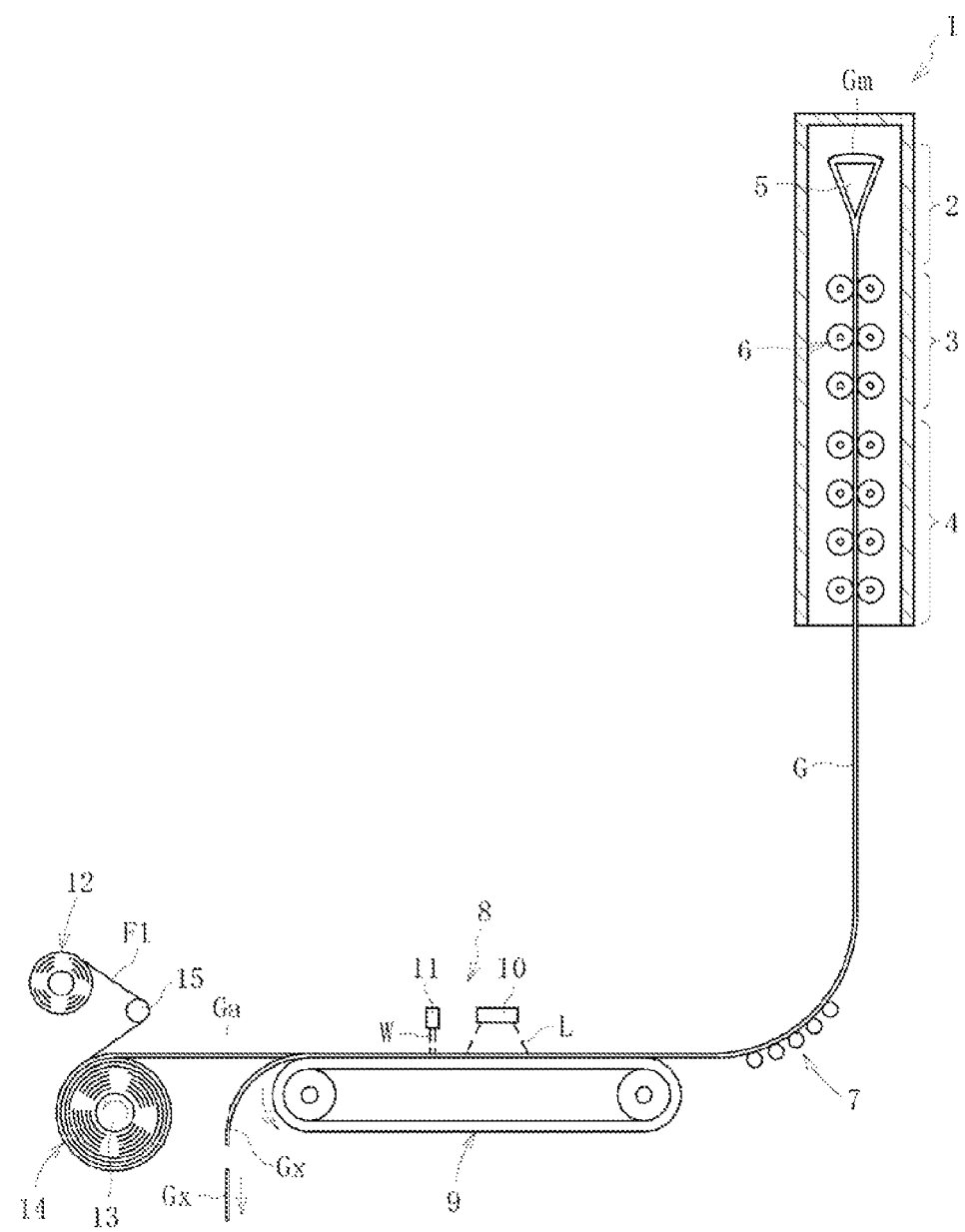
FIG. 2 A diagram illustrating a state of implementation of a forming step, a cutting step, and a temporary rolling step which are included in the method of manufacturing a glass roll according to the embodiment of the present invention.

In this embodiment, as illustrated in FIG. 2, the forming step S1 is performed by a forming device 1 for carrying out an overflow downdraw method. The forming device 1 comprises a forming zone 2, an annealing zone 3, and a cooling zone 4 in the stated order from top to bottom. Note that, the forming device 1 may carry out another downdraw method such as a slot downdraw method and a redraw method.

In the forming zone 2, molten glass Gm is fed to a forming body 5 having a wedge-shaped cross-section, and the molten glass Gm overflowing from a top of the forming body 5 to both sides thereof is fused at a lower end portion of the forming body 5 so as to flow downward. In this manner, a plate-like glass film G is formed from the molten glass Gm. The glass film G gradually increases in viscosity as the glass film G moves downward. After its viscosity reaches viscosity high enough to be capable of keeping the shape, strain of the glass film G is removed in the annealing zone 3, and further, the glass film G is cooled to near room temperature in the cooling zone 4.

In the annealing zone 3 and the cooling zone 4, at a plurality of points ranging from an upstream side to a downstream side of a conveying path for the glass film G, a roller group 6 comprising pairs of rollers is arranged, for guiding both widthwise end portions of the glass film G downward. Note that, in this embodiment, rollers, which are arranged in an uppermost portion of the forming zone 2 within the forming device 1, function as cooling rollers for cooling both the widthwise end portions of the glass film G, and also function as driving rollers for drawing the glass film G downward. On the other hand, residual rollers arranged within the forming device 1 function as idle rollers, tension rollers, and the like, for guiding the glass film G downward.

The glass film G formed in this forming step S1 is a long film having a thickness of from 1 to 600 μm (preferably, 1 to 300 μm, and more preferably, 10 to 200 μm). The glass film G is employed for, for example, a flat panel display (FPD) such as a liquid crystal display, a plasma display, and an OLED display, a glass substrate for a device such as a solar cell, a lithium ion battery, a digital signage, a touch panel, and an electronic paper display, a cover glass for an OLED lighting, a glass container for medical supplies, a window glass, and a lightweight laminated window glass.

Further, a width of the glass film G is preferably 100 mm or more, more preferably 300 mm or more, and still more preferably 500 mm or more. Note that, the glass film G is used for a wide variety of devices including a small-screen display such as a mobile phone with a small size and a large-screen display such as a television set with a large size. Thus it is preferred that the width of the glass film G be finally selected as appropriate depending on a size of a substrate of a device to be used.

Further, as a glass composition of the glass film G, there can be used various glass compositions of silicate glass and the like, such as silica glass and borosilicate glass. However, it is preferred to use non-alkali glass. The reason is as follows. When the glass film G contains an alkali component, a so-called too-abundant soda phenomenon occurs so that the glass film is structurally weathered. When the glass film G is curved, there is a risk in that the glass film is prone to break from a portion that is structurally weathered over time. Note that, the non-alkali glass herein comprises glass that does not substantially contain an alkali component, specifically, glass containing an alkali metal oxide of 1,000 ppm or less (preferably, of 500 ppm or less, and more preferably, of 300 ppm or less). Examples of glass satisfying this condition include OA-10G manufactured by Nippon Electric Glass Co., Ltd.

Further, after the glass film G formed in the forming step S1 as described above is curved in a substantially horizontal direction by a posture changing roller group 7 which comprises a plurality of rollers for supporting the glass film G from below at positions below the forming device 1, the glass film G is conveyed to the cutting step S2 while keeping its posture. Note that, the posture changing roller group 7 may be omitted as appropriate.

In the cutting step S2, an unavailable portion (ear portion) Gx formed at each widthwise end portion of the glass film G in the forming step S1 is cut and removed by a cutting device 8. The unavailable portion Gx is relatively thicker than an available portion Ga formed at a widthwise center portion of the glass film G.

Specifically, the cutting device 8 carries out laser cleaving, and comprises: conveying means 9 for conveying the glass film G, which is formed continuously by the forming device 1, to the downstream side while keeping the glass film G in a substantially horizontal posture; locally heating means 10 for locally heating the glass film G, which is placed on the conveying means 9, through application of a laser beam L from a front surface side of the glass film G; and cooling means 11 for jetting cooling water W from the front surface side of the glass film G onto a heated region heated by the locally heating means 10. When the glass film G is cut by laser cleaving in this manner, without performing post-processing such as polishing, appropriate smoothness can be easily imparted to a cut surface which forms each widthwise end surface of the glass film G. Accordingly, the end surface of the glass film G does not bite into a protective film F1, and hence there is an advantage that it is possible to satisfactorily keep separation property between the glass film G and the protective film F1. There is also another advantage that a chip resulting from micro flaws is less likely to occur in each end surface of the glass film G when the glass film G is rolled. Here, in view of attaining the above-mentioned advantages more reliably, an arithmetic average roughness Ra of each widthwise end surface of the glass film G is preferably 0.1 μm or less, and more preferably 0.05 μm or less.

In this embodiment, a carbon dioxide laser is used as the locally heating means 10, but alternatively, there may be used means capable of performing another type of localized heating such as heating with a heating wire or hot air blast. Further, the cooling means 11 jets the cooling water W as a refrigerant using an air pressure or the like. In this context, the refrigerant may include a cooling liquid other than the cooling water, a gas such as air or an inert gas, a mixture of a gas and a liquid, a mixture of a solid such as solid carbon dioxide or ice and the gas and/or the liquid, or the like. Note that, the cutting device 8 may carry out breaking and cutting along a scribe line using a diamond cutter, or carry out laser fusing.

The conveying means 9 conveys the glass film G to the downstream side, and thus prior to a region to be cooled by the cooling means 11, a region to be heated by the locally heating means 10 is subjected to scanning performed from one end portion side of the glass film G along a preset cleaving line (boundary portion between the available portion Ga and the unavailable portion Gx) extending in a longitudinal direction of the glass film G. With this, thermal stress is generated through expansion due to a heating action and through contraction due to a cooling action of a refrigerant, and an initial crack (not shown), which is previously formed in a leading end portion of the preset cleaving line, propagates along the preset cleaving line. In this manner, the glass film G is subjected to full-body cleaving continuously.

The cut unavailable portion Gx of the glass film G is bent downward to be separated from the available portion Ga, and then is discarded. On the other hand, the available portion Ga of the glass film G is conveyed to the temporary rolling step S3.

In the temporary rolling step S3, in order that the protective film F1 may be kept to form an outermost layer, the glass film G (specifically, available portion Ga) is rolled by a predetermined length around a roll core 13 while the protective film F1 unrolled from a protective roll 12 is superposed on an outer peripheral surface side of the glass film G, and then the glass film G and the protective film F1 are cut by a cutting device (not shown) in a width direction thereof. Thus, a source glass roll 14 is manufactured. At this time, when tension is excessively applied to the glass film G, excessive tension is applied to a part of the glass film G that is in a softened state near the forming body 5. As a result, a thickness of the glass film G may become unstable, or in some cases, there may arise such a fatal problem that the glass film G breaks below the forming body 5. Accordingly, in the temporary rolling step S3, while tension (for example, tension of from 0 to less than 20 N per unit width (1 m) to the glass film G) is applied to the glass film G along a rolling direction within such a range as to prevent adverse effects on formation of the glass film G, the glass film G is rolled around the roll core 13. Here, in the temporary rolling step S3, it is not necessary to actively apply tension to the glass film G, and hence there may be applied only minimum tension that acts spontaneously when the glass film G is rolled.

Further, in this embodiment, in the temporary rolling step S3, higher tension in the rolling direction is applied to the protective film F1 than to the glass film G. Specifically, for example, tension of from 0.8 to 400 N per unit width (1 m) is applied to the protective film F1. The tension to be applied to the protective film F1 is applied, for example, through setting a difference in rotation speed between the source glass roll 14 and the protective roll 12, or through interposing a tension roller 15 as illustrated in the drawing between the source glass roll 14 and the protective roll 12. With this, without applying high tension directly to the glass film G, it is possible to restrain movement of the glass film G by the protective film F1. That is, it is possible to obtain the same effect as that in a case of applying tension directly to the glass film G. Accordingly, it is possible to minimize roll misalignment or separation of the glass film G that occurs in the temporary rolling step S3. Further, the glass film G in a state of the source glass roll 14 is reliably held by the protective film F1, and hence the following situation is less likely to arise: the glass film G in the source glass roll 14 is rolled extremely tightly when the glass film G is unrolled from the source glass roll 14 in the main rolling step S4 described below.

It is preferred that the protective film F1 for the source glass roll 14 have a thickness of from 20 to 1,000 μm (more preferably, from 25 to 500 μm). Further, it is preferred that the protective film F1 have a width larger than a width of the available portion Ga of the glass film G in order to protect both widthwise end surfaces of the glass film G from various contacts. That is, it is preferred that the protective film F1 extend beyond both widthwise sides of the available portion Ga of the glass film G.

Further, by the time the temporary rolling step S3 is carried out, the temperature of the glass film G sometimes reaches 50° C. or more, and hence it is preferred that the protective film F1 be not transformed, for example, not softened at a temperature of around 100° C.

It is preferred that an elastic film be used for the protective film F1. With this, it is possible to produce the source glass roll 14 free from looseness while applying appropriate tension in the rolling direction to the protective film F1. It is preferred that a tensile elastic modulus of the protective film F1 be from 1 to 5 GPa.

It is preferred that conductivity be imparted to the protective film F1. With this, when the glass film G is taken out of the source glass roll 14, peeling electrification is less likely to occur between the glass film G and the protective film F1, therefore there may be an advantage that the protective film F1 can be easily peeled off from the glass film G. Examples of a method of imparting conductivity to the protective film F1 includes, for example, in a case where the protective film F1 is made of a resin, adding a component for imparting the conductivity, such as polyethylene glycol, into the protective film F1, and in a case where the protective film F1 is made of inserting paper, adding conductive fiber into the inserting paper. Further, it is possible to impart the conductivity into the protective film F1 also by laminating a conductive layer, such as an indium-tin-oxide (ITO) film, on a surface of the protective film F1.

Specifically, as the protective film F1, there can be used a resin film, for example, an organic resin film (synthetic resin film) such as an ionomer film, a polyethylene film, a polypropylene film, a polyvinyl chloride film, a polyvinylidene chloride film, a polyvinyl alcohol film, a polyester film, a polycarbonate film, a polystyrene film, a polyacrylonitrile film, an ethylene vinyl acetate copolymer film, an ethylene-vinyl alcohol copolymer film, an ethylene-methacrylate copolymer film, a polyamide film, a polyimide film, and cellophane. Further, in view of ensuring cushioning performance, as the protective film F1, there can be used a foamed resin film such as an expanded polyethylene resin film, and a composite material obtained by laminating the foamed resin film on the above-mentioned resin films. In addition, in the above-mentioned resin films, there may be dispersed a lubricant such as silica, which yields a satisfactory degree of slip on the glass film G. With this, slipping property of the protective film F1 can absorb a difference in lengths to be rolled between the glass film G and the protective film F1, which results from a slight difference in diameters to be rolled between the glass film G and the protective film F1. Note that, the same applies to a protective film F2 for a glass roll 16 described below.

Note that, regarding the above-mentioned matters relating to the protective film F1, the same applies to the protective film F2 for the glass roll 16 described below.

The source glass roll 14 manufactured in the temporary rolling step S3 as described above is conveyed to the main rolling step S4, and then is rerolled.

Figure 3:
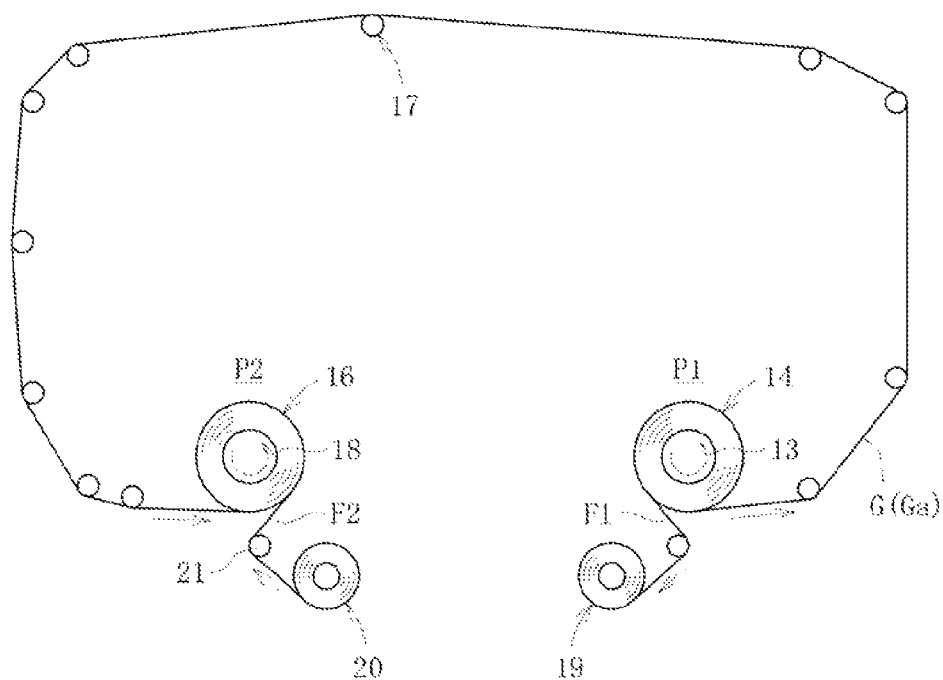
FIG. 3 A diagram illustrating a state of implementation of a main rolling step which is included in the method of manufacturing a glass roll according to the embodiment of the present invention.

In the main rolling step S4, as illustrated in FIG. 3, with use of a roll-to-roll apparatus, the glass film G (specifically, available portion Ga) unrolled from the source glass roll 14 is rerolled, and thus the glass roll 16 as a product is manufactured.

Specifically, in this embodiment, after the glass film G unrolled from the source glass roll 14 at an unrolling position P1 is guided on a roundabout route in a substantially circumferential manner by a roller group 17 comprising a plurality of rollers, the glass film G is rerolled around a roll core 18 at a rolling position P2. Thus, the glass roll 16 is manufactured. When the glass film G is guided in this manner, appropriate tension is easily applied to the glass film G also between the respective rollers of the roller group 17.

At this time, at the unrolling position P1, the protective film F1 is peeled off from the glass film G, and the peeled-off protective film F1 is rolled into a protective roll 19. On the other hand, at the rolling position P2, in order that the protective film F2 may be kept to form an outermost layer, the glass film G is rolled around the roll core 18 while the protective film F2 unrolled from another protective roll 20 is superposed on the outer peripheral surface side of the glass film G. Then, after the glass film G is rolled by a predetermined length around the roll core 18 while the protective film F2 is superposed on the glass film G, the protective film F2 (or the glass film G and the protective film F2) is cut by the cutting device (not shown) in the width direction thereof. Thus, the glass roll 16 is manufactured. In this embodiment, the protective film F2 is the same type as the protective film F1 used in the temporary rolling step S3.

Further, in the main rolling step S4, as illustrated in FIG. 1, tension "b" in the rolling direction to be applied to the glass film G is set higher than tension "a" to be applied to the glass film G in the temporary rolling step S3. Specifically, for example, tension of from 10 to 500 N per unit width (1 m) is applied to the glass film G. The tension to be applied to the glass film G is applied, for example, through setting a difference in rotation speed between the source glass roll 14 and the glass roll 16. Thus, even if roll misalignment or separation occurs in the glass film G which is included in the source glass roll 14 manufactured in the temporary rolling step S3, it is possible to apply satisfactory tension to the glass film G in the main rolling step S4, and to reroll the glass film G while straightening the roll misalignment or the like.

Note that, in the main rolling step S4, higher tension in the rolling direction may be applied to the glass film G than to the protective film F2. Specifically, for example, it is preferred that tension of from 0.8 to 400 N per unit width (1 m) be applied to the protective film F2. The tension to be applied to the protective film F2 is applied, for example, through setting a difference in rotation speed between the glass roll 16 and the protective roll 20, or through interposing a tension roller 21 as illustrated in the drawings between the glass roll 16 and the protective roll 20. In this case, a magnitude relation between the tension in the rolling direction to be applied to the protective film F2 in the main rolling step S4 and the tension in the rolling direction to be applied to the protective film F1 in the temporary rolling step S3 is not particularly limited to the above. It is possible to set the magnitude relation as appropriate in consideration of various conditions (tension to the protective film F1<tension to the protective film F2, tension to the protective film F1=tension to the protective film F2, tension to the protective film F1>tension to the protective film F2).

Further, in the main rolling step S4, as illustrated in FIG. 3, the glass film G is conveyed while only one surface of the glass film G is contact-supported, and the glass film G is rolled so that the contact-supported surface is situated on an inner peripheral surface side of the glass roll 16. Thus, even when the micro flaws occur in the contact-supported surface of the glass film G, the glass film G is rolled so that the contact-supported surface is situated on the inner peripheral surface side of the glass roll 16. In the glass roll 16, only compressive stress is applied to the inner peripheral surface of the glass film G. Accordingly, even when the micro flaws occur in the contact-supported surface, a force to propagate the micro flaws is less likely to act. In other words, on the outer peripheral surface of the glass film G on which the force to propagate the micro flaws acts, a non-contact surface having substantially no micro flaws is situated, and hence breakage of the glass film G can be reliably reduced. Note that, in this embodiment, also in the temporary rolling step S3, only one surface of the glass film G is contact-supported, and the contact-supported surface of the glass film G is set to the same side as the contact-supported surface of the glass film G supported in the main rolling step S4.

Figure 4:
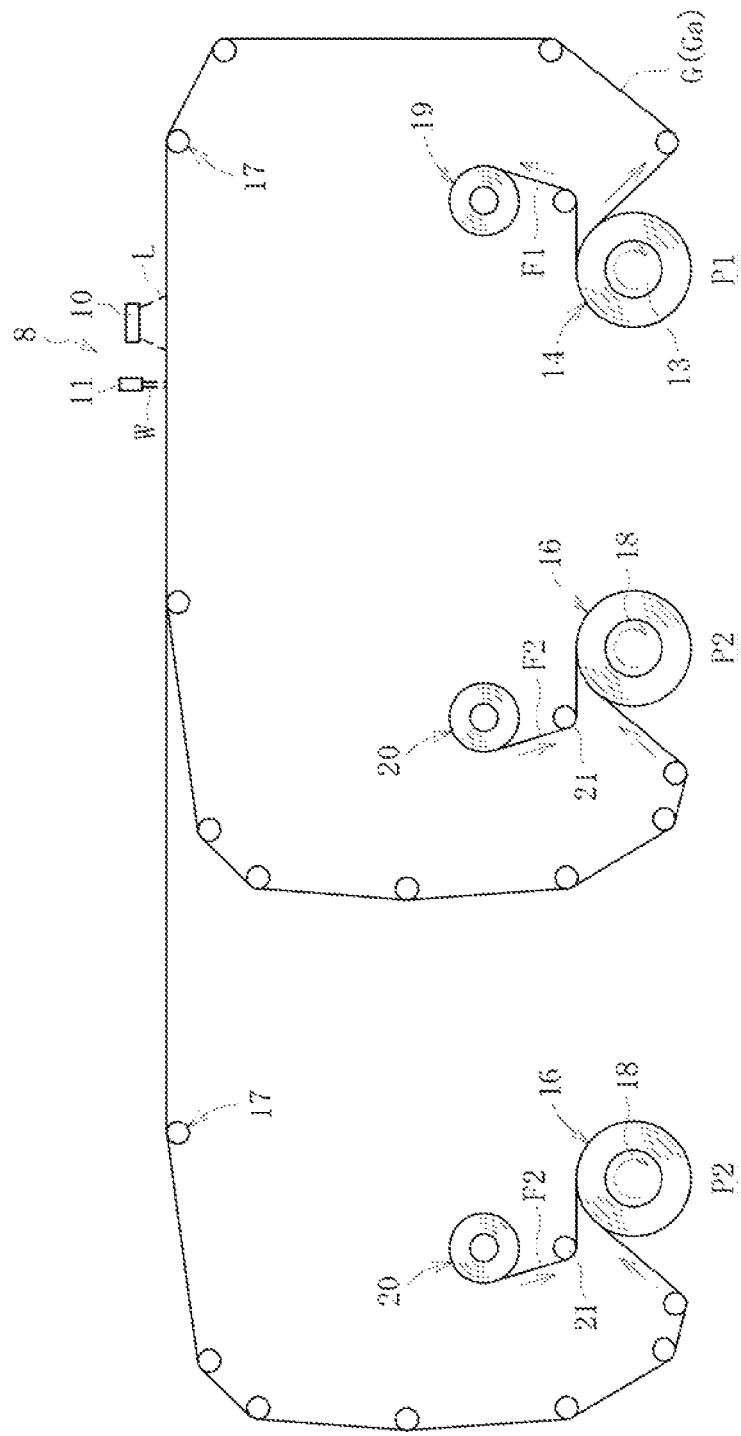
FIG. 4 A diagram illustrating another state of implementation of the main rolling step which is included in the method of manufacturing a glass roll according to the embodiment of the present invention.

Note that, the present invention is not limited to the above-mentioned first embodiment, and can be implemented in various modes. For example, as illustrated in FIG. 4, also in the main rolling step S4, the cutting step may be carried out. Specifically, the glass film G (specifically, available portion Ga) unrolled from the source glass roll 14 is cut in the width direction thereof to be divided into a plurality of (two in the illustrated example) glass films G each having a desired width. Then, each of the glass films G is rolled around the roll core 18 while superposing the protective film F2 on each of the glass films G. In this manner, a plurality of glass rolls 16 may be manufactured at the same time.

Further, in the above-mentioned embodiment, description is made of a case where a surface of the glass film G situated on the inner peripheral surface side in a state of the source glass roll 14 is conveyed as the contact-supported surface of the glass film G. However, as illustrated in FIG. 4, a surface of the glass film G situated on the outer peripheral surface side in the state of the source glass roll 14 may be conveyed as the contact-supported surface of the glass film G. Further, in the above-mentioned embodiment, description is made of a case where the glass film G is rolled so that the contact-supported surface is situated on the inner peripheral surface side of the glass roll 16. However, the glass film G may be rolled so that the contact-supported surface is situated on the outer peripheral surface side of the glass roll 16.

Figure 5:
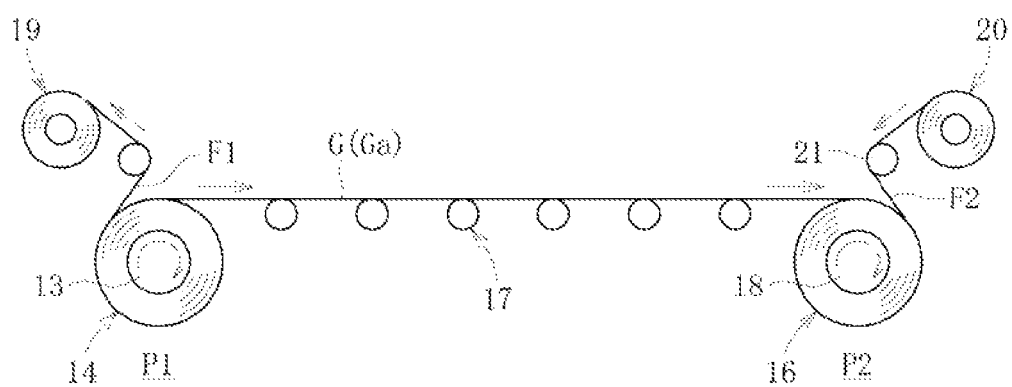
FIG. 5 A diagram illustrating still another state of implementation of the main rolling step which is included in the method of manufacturing a glass roll according to the embodiment of the present invention.

In addition, in the above-mentioned embodiment, description is made of a case where the glass film G unrolled from the source glass roll 14 is rolled in the main rolling step S4 after being guided on the roundabout route in the substantially circumferential manner. However, as illustrated in FIG. 5, the glass film G unrolled from the source glass roll 14 may be rolled after being guided in a straight manner.

Further, in the above-mentioned embodiment, description is made of a case where the main rolling step S4 is carried out only one time after the temporary rolling step S3. However, after the main rolling step S4, a step of further rerolling the glass film G may be carried out one or a plurality of times.

Next, description is made of a method of manufacturing a glass roll according to a second embodiment of the present invention. Note that, the second embodiment can be implemented in the same mode as that illustrated in FIG. 1, but is different from the first embodiment in that the temporary rolling step S3 is carried out as a main rolling step of manufacturing a glass roll as an end product.

Specifically, in the second embodiment, as illustrated in FIG. 1, the glass film G is formed by a downdraw method, and the protective film F1 is superposed on the outer peripheral side of the formed glass film G. Then, while higher tension in the rolling direction is applied to the protective film F1 than to the glass film G, the protective film F1 and the glass film G are rolled. In this manner, a glass roll as an end product is manufactured. Further, while the glass roll thus manufactured remains rolled, higher tension in the rolling direction is applied to the protective film F1 than to the glass film G.

Here, tension to be applied to the protective film F1 and tension to be applied to the glass film G are the same as the tension described in the temporary rolling step S3 described in the first embodiment (for example, tension of from 0 to less than 20 N per unit width (1 m) to the glass film G, and tension of from 0.8 to 400 N per unit width (1 m) to the protective film F1).

INDUSTRIAL APPLICABILITY

The present invention can be preferably used for a glass substrate used for a flat panel display, such as a liquid crystal display or an OLED display, for a glass substrate used for a device such as a solar cell, and for cover glass for an OLED lighting.

REFERENCE SIGNS LIST 1 forming device
2 forming zone
3 annealing zone
4 cooling zone
5 forming body
7 posture changing roller group
8 cutting device
9 conveying means
10 locally heating means
11 cooling means
14 source glass roll
16 glass roll
F1, F2 protective film
G glass film

The invention claimed is:

1. A method of manufacturing a glass roll, comprising:
forming, while conveying a glass film to a downstream side, the glass film by a forming device for carrying out a downdraw method;
rolling the glass film continuously to the forming device while separably superposing a first protective film on the glass film at a downstream end of a path of the conveying in the forming to thereby manufacture a source glass roll; and
unrolling, while conveying the glass film to the downstream side, the glass film from the source glass roll; and rerolling the glass film continuously roll while superposing a second protective film on the glass film at a downstream end of a path of the conveying in the unrolling to thereby manufacture a glass roll, wherein tension in a rolling direction is applied at a minimum level to the glass film in the rolling, and tension in the rolling direction is applied to the glass film in the rerolling in an amount that is higher than the tension in the rolling direction in the rolling.

2. The method of manufacturing a glass roll according to claim 1, wherein, in the rolling, tension in the rolling direction to be applied to the first protective film is set higher than the tension in the rolling direction to be applied to the glass film.

3. The method of manufacturing a glass roll according to claim 1, wherein, in the rerolling, the tension in the rolling direction to be applied to the glass film is set higher than tension in the rolling direction to be applied to the second protective film.

4. The method of manufacturing a glass roll according to claim 1, wherein, in the unrolling, the glass film is conveyed while only one surface of the glass film is contact-supported.

5. The method of manufacturing a glass roll according to claim 4, wherein, in the rerolling, the glass film is rolled so that the contact-supported surface of the glass film is situated on an inner peripheral surface side of the glass roll.

6. The method of manufacturing a glass roll according to claim 1, wherein, in at least one of the rolling and the rerolling, the glass film is rolled and/or rerolled after being cut by laser cutting into pieces each having a predetermined width.

7. The method of manufacturing a glass roll according to claim 1, wherein the downdraw method comprises an overflow downdraw method.

8. The method of manufacturing a glass roll according to claim 1, wherein the glass film has a thickness of 1 μm or more and 300 μm or less.

9. A method of manufacturing a glass roll, comprising:
forming a glass film by a down draw method with a forming device; and rolling the formed glass film continuously to the forming device while separably superposing the glass film on a protective film, wherein tension in a rolling direction is applied at a minimum level to the glass film in the rolling, and the glass film and the protective film are rolled while higher tension in the rolling direction is applied to the protective film than to the glass film.

10. The method of manufacturing a glass roll according to claim 9, wherein an unavailable portion formed at each widthwise end portion of the glass film is cut by laser cutting by the time the glass film is rolled.

11. The method of manufacturing a glass roll according to claim 9, wherein the glass film and the protective film are rolled while the protective film is superposed on an outer peripheral surface side of the glass film so that the protective film is kept to form an outermost layer.

12. The method of manufacturing a glass roll according to claim 9, wherein the downdraw method comprises an overflow downdraw method.

13. The method of manufacturing a glass roll according to claim 2, wherein, in the rerolling, the tension in the rolling direction to be applied to the glass film is set higher than tension in the rolling direction to be applied to the second protective film.

14. The method of manufacturing a glass roll according to claim 2, wherein, in the unrolling, the glass film is conveyed while only one surface of the glass film is contact-supported.

15. The method of manufacturing a glass roll according to claim 14, wherein, in the rerolling, the glass film is rolled so that the contact-supported surface of the glass film is situated on an inner peripheral surface side of the glass roll.

16. The method of manufacturing a glass roll according to claim 2, wherein, in at least one of the rolling and the rerolling, the glass film is rolled and/or unrolled after being cut by laser cutting into pieces each having a predetermined width.

* * * * *